United States Patent [19]

Rampel

[11] 3,877,985

[45] Apr. 15, 1975

[54] CELL HAVING ANODE CONTAINING SILVER ADDITIVE FOR ENHANCED OXYGEN RECOMBINATION

[75] Inventor: Guy G. Rampel, Gainesville, Fla.

[73] Assignee: General Electric Company, Owensboro, Ky.

[22] Filed: July 27, 1973

[21] Appl. No.: 383,066

Related U.S. Application Data

[63] Continuation-in-part of Ser. No. 154,488, June 18, 1971, abandoned.

[52] U.S. Cl. ................................................ 136/24
[51] Int. Cl. .......................................... H01m 43/04
[58] Field of Search ........... 136/24, 20, 120, 78, 76, 136/77; 204/46

[56] References Cited

UNITED STATES PATENTS

| | | | |
|---|---|---|---|
| 2,737,541 | 3/1956 | Coolidge | 136/24 X |
| 3,440,100 | 4/1969 | Gumucio et al. | 136/24 X |

Primary Examiner—John H. Mack
Assistant Examiner—C. F. LeFavour
Attorney, Agent, or Firm—D. A. Dearing; F. L. Neuhauser

[57] ABSTRACT

A nickel-cadmium, secondary cell having the cadmium electrode impregnated with metallic silver to catalyze the oxygen recombination reaction and thereby helping to avoid excessive gas pressure due to oxygen generated during cell overcharge.

4 Claims, 3 Drawing Figures

CELL HAVING ANODE CONTAINING SILVER ADDITIVE FOR ENHANCED OXYGEN RECOMBINATION

This is a continuation-in-part of application Ser. No. 154,488, filed June 18, 1971, entitled "Silver Coated Negative Electrode for Enhanced Oxygen Recombination," now abandoned.

BACKGROUND OF THE INVENTION

This invention relates to electrodes for electrochemical cells. More particularly, the invention relates to an improved anode having silver particles impregnated therein to enhance the oxygen recombination properties of the electrode.

In the operation of a sealed electrochemical cell, chemical reaction between one of the electrodes and a gas generated during overcharge is sometimes necessary to relieve the pressure built up by the generated gas. In a sealed, secondary cell, for example, hydrogen and oxygen may be present when one or both of the electrodes become fully charged. To avoid generation of hydrogen at the negative electrode or anode, it is customary to provide slightly less capacity in the positive electrode than the negative electrode so that the positive electrode becomes fully charged before the negative electrode. This results in the production of oxygen gas at the positive electrode as follows:

$$4\ OH^- \rightarrow O_2 + 2H_2O + 4e \qquad \text{I}$$

The oxygen evolved at the positive electrode in turn reacts at the negative electrode according to the following reaction:

$$O_2 + 2H_2O + 4e \rightarrow 4\ OH^- \qquad \text{II}$$

which, for example, in the presence of charged, metallic cadmium as the "active material" of the negative electrode of a sealed nickel-cadmium cell, further reacts to form $Cd(OH)_2$:

$$2Cd + 4OH^- \rightarrow 2Cd(OH)_2 + 4e \qquad \text{III}$$

combining equations II and III together, the reaction of oxygen at the negative terminal of a sealed cell in the presence of metallic cadmium can be written:

$$2Cd + O_2 + 2H_2O \rightarrow 2Cd(OH)_2 \qquad \text{IV}$$

This oxidation reaction is sometimes referred to as "recombination" because the oxygen generated at the positive electrode is said to "recombine" with the active cadmium metal.

The use of the term "active material" is intended to define the material within the electrode which provides or uses up energy as it oxidizes or reduces during charge and discharge cycles of the cell.

To prevent an undesirable build-up of gas pressure within a sealed cell as well as to prevent the negative electrode from becoming fully charged, it is essential that the oxygen generated at the positive electrode react or recombine quickly and efficiently with the active material of the negative electrode.

Another problem associated with the undesirable build-up of gas pressure within a sealed cell is the tendency of electrolyte within the cell to become redistributed throughout the cell after use of the cell over extended periods of time. Safety requirements necessitated to avoid excessive gas pressure levels limit the amount of electrolyte which can be initially placed in the cell. Thus, after extended use and redistribution of the electrolyte, an inadequate supply of electrolyte, for optimum operation, may remain to function as a medium to support ion transfer between the electrodes of the cell. It can, therefore, be seen that if the oxygen recombination can be enhanced, this will allow the use of more electrolyte while incurring no greater risk of excessive gas pressure levels.

Heretofore it has been noted that when a metal more electropositive than the active material of the negative electrode is introduced into a cell, the oxygen recombination with the active material is enhanced. For example, the U.S. Pat. No. 3,410,725 dated Nov. 12, 1968, to Harivel suggests that silver particles could be introduced into the cell by forming through repeated cycles of a chemical deposition process a dense porous layer of the particles on a porous carrier, separate and distinct from the conventional separator, which is then positioned between the anode of the cell and the separator in such a manner that silver particles are in contact with the active surface of the anode.

Further, as noted in the Harivel patent, this mode of introducing the silver particles was believed to be an improvement over an earlier-disclosed arrangement, as in French Pat. No. 1,218,433 to Stanimerovitch, where it was suggested that the additive metal be disposed within the conventional separator itself.

It will be readily appreciated that the prior methods of introducing the additive metal is subject to serious disadvantages in that (1) if applied in accordance with the apparent teaching of Stanimerovitch, there is the danger of short-circuiting between the main electrodes; and (2) if applied in accordance with the apparent teaching of Harivel, (a) there is the obvious need for an excess amount of relatively expensive material, such as silver, (b) the fact that the silver is disposed in such a manner as to fail to provide intimate electrochemical contact between all the silver provided and active material of the electrode, and (c) the fact that silver particles not in intimate contact and thus not forming Ag-Cd couples at the interface of the silver-plated porous carrier and the anode will form when exposed to the oxygen generated during overcharge in the presence of the alkaline cell electrolyte a soluble oxide of silver which can migrate to the separator and possibly cause short-circuiting as experienced in the apparent teaching of Stanimerovitch. It is, therefore, an object of the present invention to provide new and improved electrode structure for such cells which overcomes the inherent disadvantages of the prior art as shown by the Harivel and Stanimerovitch patents.

Another object of the invention is to provide an intimate association of the additive metal with the active material of the anode throughout the electrode structure.

Another object of the invention is to provide a sealed cell which can accommodate a greater quantity of electrolyte without increasing the risk of excessive gas pressure levels within the cell than was heretofore possible.

A further object of this invention is to greatly minimize the amount of additive metal required to catalyze the recombination reaction. These and other objects of the invention will be apparent from the description and the drawing.

In accordance with the invention a nickel-cadmium, secondary cell is provided with an improved negative electrode whereby oxygen gas recombination with the active material is enhanced. The negative electrode comprises a substrate with nickel particles bonded thereon, an active cadmium material impregnated in the pores of the nickel mass and a small deposit of submicroscopic silver particles uniformly and widely dispersed throughout the pores of the nickel mass.

DESCRIPTION OF THE PREFERRED EMBODIMENT

Figure 1:
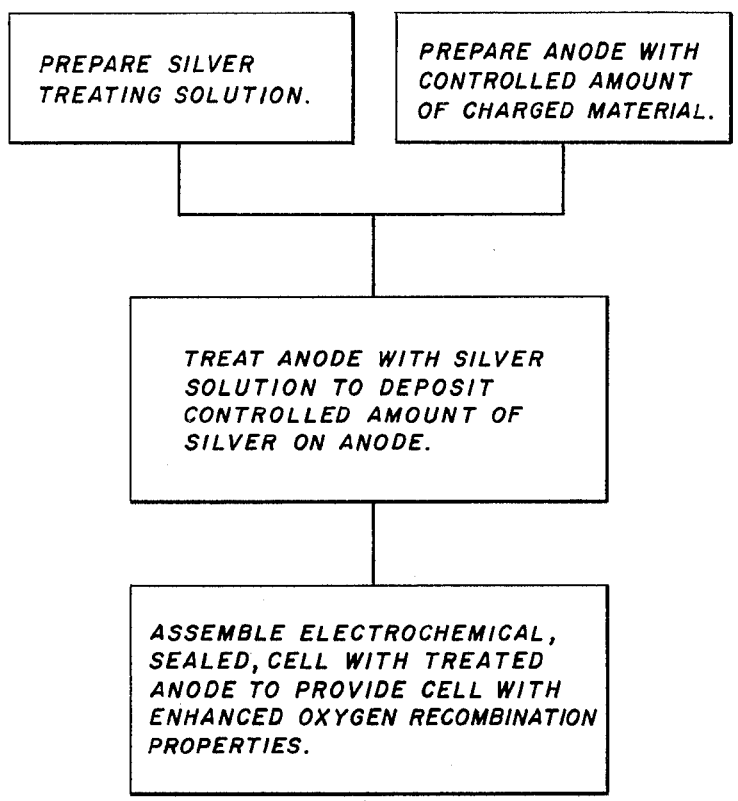
FIG. 1 is a flow sheet of the invention.

In accordance with this invention, a cadmium negative electrode is treated to catalize the oxygen recombination thereon by incorporating submicroscopic metallic silver particles in the cadmium electrode structure. While the exact mechanism by which the presence of silver catalyzes the oxygen recombination reaction at the electrode is not fully understood, it is thought that it may be explained by an electrochemical phenomenon. The phenomenon which is thought to exist is the formation of small electrochemical cells of nickel and cadmium particles in close association with each other at the anode. These cells form a short-circuiting current on which the oxygen generated at the cathode may be reduced. With the addition of silver particles, it is presumed that small electrochemical cells of silver and cadmium are also formed which perform in a similar manner to the small nickel-cadmium cells. Thus, because silver is more catalytically active for oxygen recombination than nickel, the oxygen recombination will be enhanced by the addition of silver particle and the subsequent formation of the small Ag-Cd cells relative to that ordinarily achieved due to the formation of the small Ni-Cd cells.

The amount required for construction of cells having enhanced oxygen recombination reactions is preferably between 0.001 and 0.1 percent by weight of the total electrode excluding the substrate. While the minimum amount can be very small as specified, it should be recognized that the enhanced oxygen recombination reaction will still be provided in cells utilizing much larger percentages by weight of silver metal. However, the utilization of larger amounts of silver is constrained by economic factors, the desired capacity of the cell which is a function of the amount of active material impregnated in the electrode structure and the available pore volume in the electrode structure.

Two features of the invention which enable minute amounts of silver to be utilized to provide a cell with greatly improved control and resolution of internal gas pressure problems during recharging of a cell are the submicroscopic size of the silver particles incorporated in the electrode structure and the wide and uniform dispersion of these microscopic silver particles throughout the electrode pore structure. The particle size of the silver additive results from the use of a replacement reaction under specified control conditions. The wide dispersion of the silver particles is achieved due to the electrode pore structure and the process by which the silver is incorporated therein described hereinbelow.

As to the first, scanning electron micrographs have revealed that the silver particles achievable with the preferred chemical deposition process are colloidal in size, having an estimated average diameter of 2,500 angstroms (A) assuming spherical shape. It can be noted that electrodes treated with the silver additive are black in color rather than the grayish-white characteristic color of silver. Thus, since the treated electrode is black in color and hence the silver particles thereon do not metallically reflect light aids in verifying the estimated particle size as being smaller than the wavelength of electromagnetic waves in the visible region, 4,000 A to 8,000 A.

Secondly, the wide dispersion, as have been stated, is due, in part, to the electrode pore structure. However, the pore structure developed by conventional methods is adequate for the practice of this invention. The preferred type of electrode structure is the sintered construction; but it will be appreciated by those skilled in the art that the invention may also be readily practiced utilizing the well known, pasted or pressed electrode construction. The sintered construction forms a porous plaque by thermal bonding of individual grains of carbonyl nickel powder to a substrate usually constructed of a nickel-plated steel grid. Scanning electron micrographs of carbonyl nickel show the particles to be from 1–4 microns in diameter (10,000 A to 40,000 A), of irregular shape and having numerous, very sharply pointed peripheral projections. The sintered mass usually has a porosity of between 75 and 85 percent. Thus it can be appreciated that the silver particles can be widely dispersed in intimate association with the active material of the electrode.

Additionally, the placement of the silver in the anode, as set forth herein, as opposed to in a separate porous carrier is important in that the silver particles will be maintained at the potential of the anode and thus keeping the silver from being oxidized to form a soluble silver oxide. This aids in avoiding the short-circuiting problems experienced with prior art constructions as well as enabling the use of minute quantities of silver since the silver deposit can be maintained within the anode.

Figure 2:
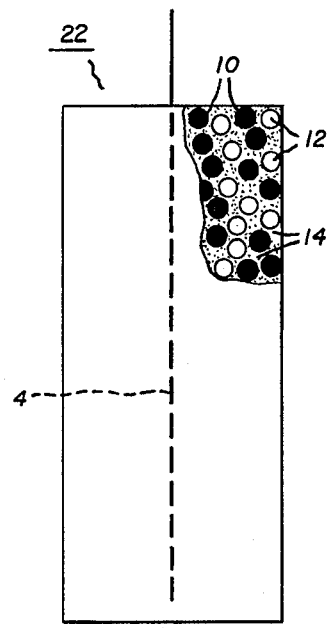
FIG. 2 is a partially broken-away side view of the electrode of the invention.

In accordance with the preferred embodiment of the invention, a small amount of cadmium active material of the negative electrode as illustrated in exaggerated form in FIG. 2, as at 12, for illustrative purposes is present in a reduced or charged state. This amount, for example, comprises about 5–30 weight percent, preferably about 15–25 weight percent, of the active material of the electrode and is despersed throughout the porous mass of the electrode. This may be incorporated into the electrode during the formation or alternatively the electrode may be charged slightly after it has been formed. The silver is applied to the electrode by immersing the electrode into a solution containing silver ions. The silver ions upon contacting the reduced active metal of the electrode enter into a redox reaction wherein the active metal is oxidized and the silver is reduced to metallic silver. Thus, as can be seen, the amount and dispersion of charged material throughout the mass of the active material is important, since this controls the amount of silver reduced and deposited within and throughout the electrode. Also, this factor is thought to have an effect on generating silver particles of submicroscopic size.

As illustrated in FIG. 2, an anode 2 comprises a conductive substrate 4 consisting, for example, of sintered or bonded nickel having particles of cadmium active material dispersed throughout the porous matrix. Some of the particles (as indicated at numeral 10) are uncharged or oxidized while other particles (as indicated by numeral 12) are charged particles, which comprises, in a cadmium electrode, metallic cadmium. The silver ions are reduced to metallic silver (indicated by numeral 14) in a replacement or oxidation-reduction reaction with the exposed surfaces of cadmium particles 12. It should be understood that, while the oxidized silver particles are reduced in a reaction with a predetermined amount of reduced cadmium particles, the silver particles are thought not to be retained in any preferred association with the cadmium particles originally in a reduced state. That is to say, the silver particles essentially remain in a uniform and widely dispersed condition throughout the pore structure of the electrode as the cell goes through repeated charge and discharge cycles.

As previously mentioned in accordance with the preferred embodiment, the active material of the anode is preferably cadmium. However, other active materials such as, for example, zinc can comprise the active anode material if they are positioned with respect to silver in the electromotive series such that they oxidize in preference to silver. This is important both from the standpoint of the initial deposition of metallic silver on the surface of the active material as well as the subsequent performance of the anode. The choice of active anode material which will oxidize in preference to silver prevents formation of silver oxide on the anode which would, in an alkaline system, migrate from the anode.

It should be further noted here that the invention is directed toward an electrochemical cell which does not already contain a silver electrode, that is, a cell where neither the anode nor the cathode comprise silver in either reduced or oxidized form as the active material of the electrode. The term electrochemical cell, as herein used, is intended to define a cell which does not contain silver in either reduced or oxidized form as the principal active material of either electrode.

Figure 3:
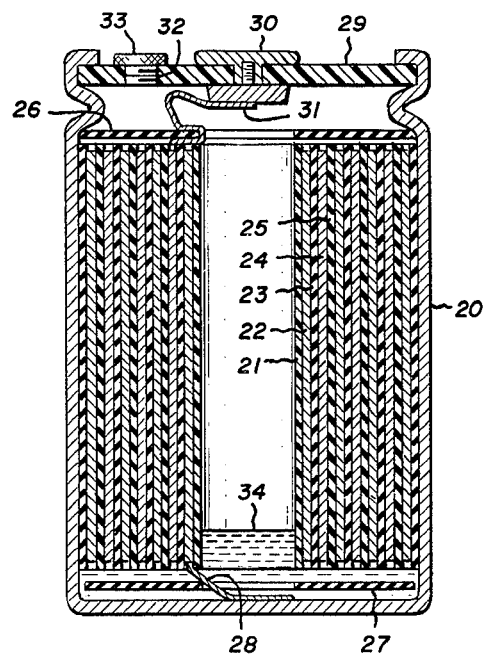
FIG. 3 is an axial cross-sectional view of an embodiment of the cell in which the electrode may be incorporated.

An example of the type of secondary cell, preferably a Ni-Cd alkaline cell, in which the anode or negative plate 2 of FIG. 2 may be incorporated, is illustrated in FIG. 3. The cell includes an outer casing 20 forming one terminal of the cell. Within the cell is mounted a winding spindle 21 formed of insulating material and having spirally wound thereon a four-layer assembly consisting of a first layer 22 of the negative plate 2, a second layer 23 formed of a porous insulating separator, a third layer 24 which forms one portion of the positive plate of the cell, and a fourth layer 25 which is a porous insulating separator. To prevent short-circuiting between the edges of the plates and the cell casing, annular insulating discs 26 and 27 are provided. The negative plate is connected to the cell casing through lead 28. To provide a positive cell terminal, an insulating element 29 is mounted in the upper end of the conductive casing by crimping. The element mounts a positive terminal 30 which is connected to the positive plate by lead 31. A port 32 is provided in the insulating element for the admission of electrolyte to the cell, the preferred type electrolyte for Ni-Cd being alkaline, as is well known. As shown, the port is provided with a plug 33. The electrolyte is drawn between the plates by capillary action of the porous insulating separator. Excess electrolyte fills the bottom of the casing and may extend upwardly into the winding spindle to a level 34 as illustrated. The cell shown in FIG. 2 is sealed; but it will be recognized by those skilled in the art that this invention also has utility in a vented cell.

The silver treating solution comprises an alkaline silver solution preferably containing, in addition to silver ions, a complexing agent to inhibit formation of insoluble silver salts within the treatment bath without interfering with the redox reaction of the silver ions with the reduced active material of the anode to be treated. Silver ions can also be produced, however, by dissolving $Ag_2O$ in a noncomplexing alkaline solution such as potassium hydroxide. The quantity of silver ions, even in a saturated solution, however, is lower than in the preferred solution.

In a preferred embodiment, the silver treating solution comprises a mixture of silver nitrate, a quaternary-ammonium chloride polymer, a base (preferably KOH), and water. The quaternary-ammonium polymer comprises a diallyldimethylammonium chloride polymer. The material is commercially available as a dilute aqueous solution from the Calgon Company under the trademark "Cat-floc" and is described in more detail in my U.S. Pat. No. 3,660,170, filed Apr. 8, 1970, and issued on May 2, 1972, and assigned to the assignee of the invention herein.

The preferred silver treating solution is prepared by dissolving the quaternary-ammonium chloride polymeric material into distilled water at a ratio of about 10–11 grams of polymer to 100 milliliters water. A second solution is prepared by dissolving silver nitrate into water at a ratio of about 1–2 grams of silver nitrate to 100 milliliters of water. The solutions are combined and then made alkaline by the addition of a base such as KOH in a preferred ratio of about 100 milliliters of 31 percent KOH per 300 milliliter of solution. The solution is made alkaline to prevent dissolution of the active material as it reacts with the silver during the deposition. In the presence of a base the deposition, for example, of silver on a negative electrode containing metallic cadmium can be characterized as:

$$2Ag^+ + 2OH^- + Cd \rightarrow 2Ag + Cd(OH)_2$$

The cadmium hydroxide formed in the reaction remains on the electrode when a basic solution is used for the deposition.

The anode plates are treated by immersing them in the solution in an evacuatable container. Preferably, in order to evacuate the pores of the electrode allowing the solution to disperse throughout the porous mass, a vacuum of about negative 25–30 inches of Hg is maintained for about 2–10 minutes after which the container is returned to atmospheric pressure and the plates removed. The plates are then scrubbed, washed and dried as normal anodes and subsequently incorporated into cells.

The anode, in an alternate embodiment, may also be treated in situ in an already assembled cell such as, for example, a nickel-cadmium cell by substituting for the KOH electrolyte, a silver oxide-saturated KOH solution which has been previously filtered to remove any undissolved silver salts.

It will be understood by those skilled in the art that there are other acceptable methods for impregnating the electrode with metallic silver.

The invention may be better understood with reference to the following example:

EXAMPLE I

A silver treating solution was prepared by first dissolving 32 grams of Cat-floc into 300 milliliters of distilled water. A second solution was prepared by dissolving 3.4 grams of silver nitrate into 300 milliliters of distilled water. These two solutions were then combined while stirring. To the resulting solution was added 200 milliliters of approximately 31 percent KOH.

The resulting silver solution was used to treat two 10 ampere-hour cadmium anode plate packs having about 10 percent metallic cadmium therein. The plates were separated by a corrugated polyvinyl separator and immersed in the silver solution and a negative 30 inch vacuum pulled for 5 minutes. The container was returned to atmospheric pressure and then immersion under vacuum was repeated for another 5-minute period. The temperature at which the solution is prepared and at which the plates are treated with the solution is not critical and may be room temperature if desired.

The plates were then removed from the impregnation, placed singly on filter paper, and blotted dry. The plates were then scrubbed, washed and dried. The treated plates, excluding the substrate, were analyzed for silver pickup by Atomic Absorption Analysis and found to have picked up about 0.008 percent by weight silver excluding the substrate. The treated plates were incorporated into Ni-Cd cells as the anode and tested to ascertain the oxygen recombination capability of the plates. It was found that a one ampere overcharge could reliably be maintained at 32°F without reducing the volume of electrolyte. The pressure within the cells at a C/10 charging rate at 32°F was below 50 p.s.i. gage and the voltage below 1.520 after 72 hours of charge. In contrast, control cells, also 10 ampere-hour, without the silver additive could only be overcharged with a maximum current of ½ ampere (C/20) with pressure levels ranging up to 100 p.s.i. gage.

Thus the invention provides an improved anode catalyzing the oxygen recombination reaction thereby allowing higher overcharge rates, faster charging, and a lower minimum ambient temperature during overcharge.

While the preferred embodiment of the invention has been illustrated, other minor variations will be apparent to those skilled in the art and should be deemed to be within the scope of the invention.

What is claimed is:

1. A nickel-cadmium secondary, electrochemical cell having enhanced oxygen recombination properties comprising:
   a. a casing;
   b. a positive electrode disposed in said casing;
   c. a negative electrode disposed in said casing, said positive and negative electrodes comprising:
      1. a conductive substrate;
      2. a porous plaque of sintered nickel powder disposed on said substrate; and
      3. an active material impregnated in the pores of said porous plaque, the active material of said positive and negative electrodes in a discharged state consisting essentially of $Ni(OH)_2$ and $Cd(OH)_2$, respectively;
   d. a porous separator disposed between said positive and negative electrodes;
   e. an alkaline electrolyte filling a portion of said casing;
   f. a small deposit of catalytically active silver particles dispersed throughout the pores of said porous plaque of the negative electrode.

2. The cell of claim 1 wherein the silver particles are approximately 0.001 to 5 percent by weight of the total electrode excluding the substrate.

3. The cell of claim 1 wherein said deposit of silver particles is incorporated in the pores of said porous plaque of said negative electrode by forming a dispersion of 5 to 30 percent by weight of metallic cadmium (in reduced state) in the pores of said porous material and then exposing reduced cadmium to a source of oxidized silver such that said oxidized silver and reduced cadmium will enter into an oxidation-reduction reaction to deposit at least 0.001 percent by weight of the total electrode excluding the substrate of reduced silver in the pores of said porous material.

4. A nickel-cadmium secondary, electrochemical cell having enhanced oxygen recombination properties comprising:
   a. a casing;
   b. a positive electrode disposed in said casing;
   c. a negative electrode disposed in said casing, said positive and negative electrodes comprising:
      1. a conductive substrate having porous material thereon;
      2. an active material impregnated in the pores of said porous material, the active material of said positive and negative electrodes in a discharged state consisting essentially of $Ni(OH)_2$ and $Cd(OH)_2$, respectively;
   d. a porous separator disposed between said positive and negative electrodes;
   e. an alkaline electrolyte filling a portion of said casing;
   f. a small deposit of catalytically active silver particles dispersed throughout the pores of said porous material of the negative electrode, said silver deposit being less than or equal to 5 percent by weight of the negative electrode excluding the substrate.

* * * * *